(12) United States Patent
Le Bot

(10) Patent No.: US 7,263,859 B2
(45) Date of Patent: Sep. 4, 2007

(54) PROCESS AND APPARATUS FOR COOLING A STREAM OF COMPRESSED AIR

(75) Inventor: Patrick Le Bot, Vincennes (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 365 days.

(21) Appl. No.: 11/023,002

(22) Filed: Dec. 27, 2004

(65) Prior Publication Data

US 2006/0137392 A1    Jun. 29, 2006

(51) Int. Cl.
*F25J 3/00* (2006.01)
*F28B 3/00* (2006.01)

(52) U.S. Cl. .......................... 62/648; 62/643; 62/903; 165/112; 165/912

(58) Field of Classification Search ............... 62/643, 62/648, 903; 165/912, 110, 111, 112
See application file for complete search history.

(56) References Cited

U.S. PATENT DOCUMENTS

| | | | |
|---|---|---|---|
| 4,279,734 A | * | 7/1981 | Gwyn .................. 208/48 Q |
| 4,367,082 A | | 1/1983 | Tomisaka et al. |
| 4,380,910 A | * | 4/1983 | Hood et al. .................. 62/91 |
| 4,461,154 A | | 7/1984 | Allam |
| 4,545,134 A | * | 10/1985 | Mukerjee et al. .............. 34/468 |
| 5,461,870 A | * | 10/1995 | Paradowski .................. 62/620 |
| 5,592,832 A | * | 1/1997 | Herron et al. ................ 62/646 |
| 5,669,237 A | | 9/1997 | Voit |
| 5,724,834 A | * | 3/1998 | Srinivasan et al. ........... 62/643 |
| 5,775,129 A | * | 7/1998 | Satchell et al. ............... 62/643 |
| 5,840,159 A | * | 11/1998 | Rosenblad .................... 203/10 |
| 6,117,916 A | | 9/2000 | Allam et al. |

* cited by examiner

Primary Examiner—William C Doerrler
(74) Attorney, Agent, or Firm—Elwood Haynes

(57) ABSTRACT

Process and apparatus for cooling a compressed gas stream which utilizes one or more elongated vessels having a substantially vertical orientation. Each vessel has one compartment for indirect heat exchange between the compressed gas stream and a cooling stream and a second compartment for direct contact between the compressed gas stream and a liquid stream. The two compartments are separated by a barrier, which allows for upward passage of air, but prevents the downward passage of liquid. The design permits one to use the heat present in the compressed air efficiently.

12 Claims, 2 Drawing Sheets

PROCESS AND APPARATUS FOR COOLING A STREAM OF COMPRESSED AIR

BACKGROUND

The present invention relates to a process and an apparatus for cooling a stream of compressed air.

It is frequently desirable to cool a stream of compressed air to remove the heat of compression and, in some cases, to cool the air to a subambient temperature, such as in the case where an adiabatic compressor is used to compress air to be separated in a cryogenic distillation plant.

The standard procedure is to send the compressed air to a cooling tower where it is cooled by direct contact with water from a refrigeration circuit. U.S. Pat. Nos. 4,367,082, and 5,669,237 describe standard cryogenic distillation air separation units in which air is cooled by indirect heat exchange with water and then purified and sent to the columns to be separated.

It is known from U.S. Pat. No. 4,461,154 that air compressed in an adiabatic compressor may be used to preheat boiler feed water. U.S. Pat. No. 6,117,916 describes the use of heat from an adiabatic compressor to warm a working fluid before sending the air from the compressor. The air is then further cooled and sent to an air separation unit.

SUMMARY

It is an object of the present invention to use the heat present in the compressed air efficiently so as to generate energy.

The invention provides a process for cooling a gas stream in an apparatus comprising:
a) providing at least one elongated vessel having a substantially vertical orientation, wherein said elongated vessel comprises:
 (i) a first end and a second end;
 (ii) a first compartment for indirect heat exchange between a gas stream and at least one cooling stream to produce a cooled gas stream;
 (iii) a second compartment for direct contact between said cooled gas stream and a liquid stream to produce a further cooled gas stream; and
 (iv) a barrier which separates said first and second compartments, allows for the upward passage of gas, but prevents the downward passage of liquid;
b) introducing the gas stream into said first compartment proximate to said first end, and removing said further cooled gas stream from said second compartment proximate to said second end;
c) introducing at least one cooling stream into said first compartment, and removing said warmed at least one cooling stream from said first compartment; and
d) introducing a liquid stream into said second compartment proximate to said second end, and removing said warmed liquid stream from said second compartment proximate to said barrier.

Additionally, the invention provides an apparatus for cooling a compressed gas stream comprising at least one elongated vessel having a substantially vertical axis orientation, wherein said elongated vessel comprises:
a) a first end and a second end;
b) a first compartment for indirect heat exchange between the compressed gas stream and at least one cooling stream;
c) a second compartment for direct contact between said cooled compressed gas stream and a liquid stream;
d) a barrier which separates said first and second compartments, allows for the upward passage of gas, but prevents the downward passage of liquid when in use;
e) a conduit for introducing said compressed gas stream into said first compartment proximate to said first end;
f) a conduit for removing said cooled compressed gas stream from said second compartment proximate to said second end;
g) a conduit for introducing said at least one cooling stream into said first compartment;
h) a conduit for removing the warmed at least one stream from the first compartment;
i) a conduit for introducing said liquid stream into said second compartment proximate to said second end; and
j) a conduit for removing said warmed liquid stream from said second compartment proximate to said barrier.

BRIEF DESCRIPTION OF DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
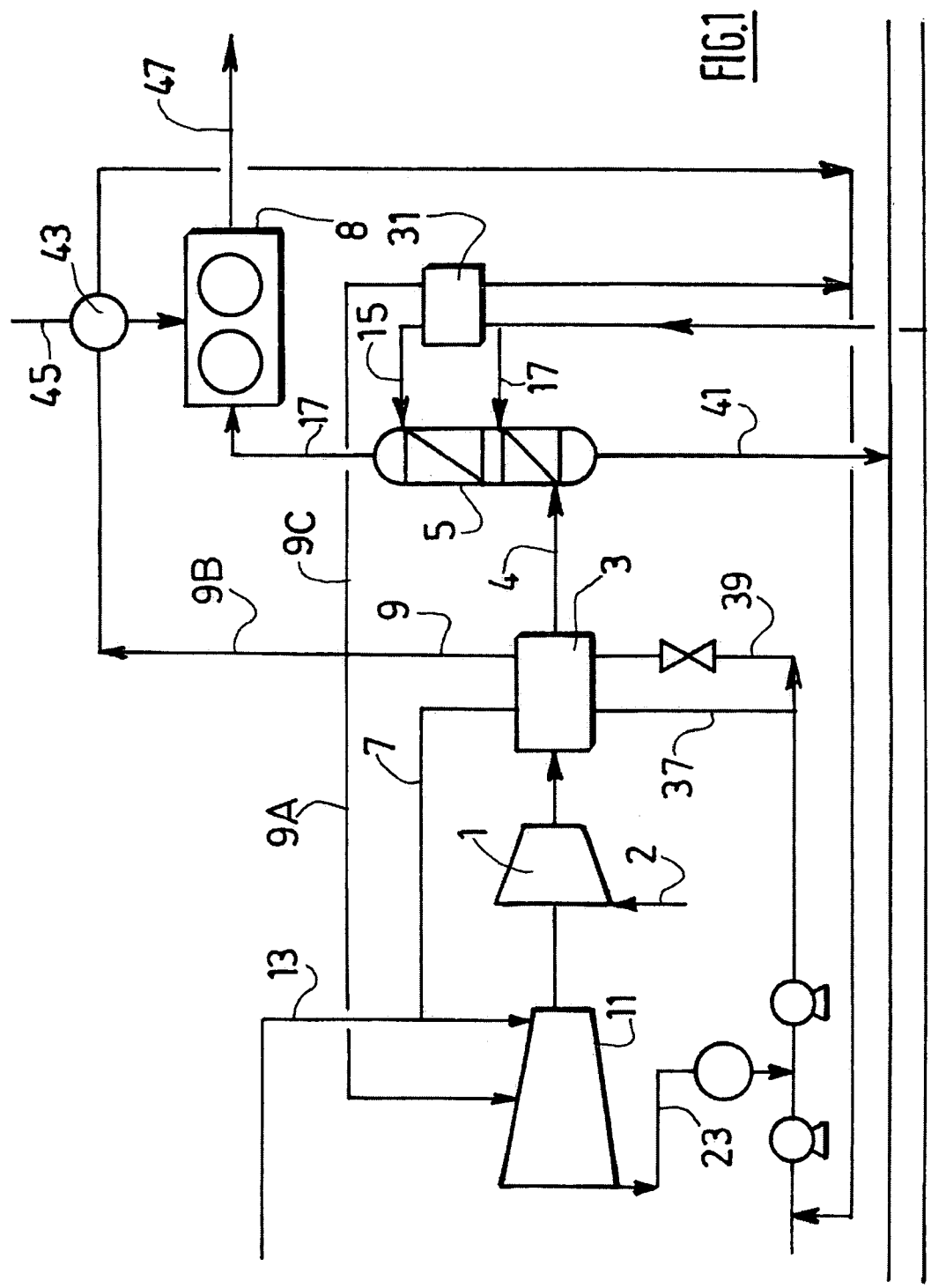
FIG. 1 illustrates a first embodiment of the invention.

The invention provides a process for cooling a gas stream in an apparatus comprising an elongated vessel having an axis oriented, in use, substantially vertically, said elongated vessel comprising a first end and a second end, a first compartment for indirect heat exchange between the gas stream and at least one cooling stream to produce a cooled gas stream and a second compartment for direct contact between the cooled gas stream and a liquid stream to produce a further cooled gas stream, said first and second compartments being separated by a barrier which, in use, allows the upward passage of gas but prevents the downward passage of liquid, comprising introducing the gas stream into the first compartment proximate to the first end, removing the further cooled gas stream from the second compartment proximate to the second end, introducing the at least one cooling stream into the first compartment, removing the warmed at least one cooling stream from the first compartment, introducing the liquid stream into the second compartment proximate to the second end and removing the warmed liquid stream from the second compartment proximate to the barrier.

According to additional embodiments of the invention, the process comprises:
a) introducing at least two cooling streams into the first compartment, said at least two cooling streams having at least one of different pressures and different temperatures;
b) exchanging heat by indirect contact between the gas stream and the at least one cooling stream in the first compartment and exchanging heat by direct contact between the cooled gas stream and the liquid stream in the second compartment;
c) where the at least one cooling stream is a liquid, vaporizing the cooling stream in the first compartment by heat exchange with the gas stream and removing the at least one cooling stream from the first compartment as a vapor; and d) introducing a further liquid stream into the second compartment at an intermediate point thereof.

Another embodiment of the invention provides a process for the separation of air in which the air is compressed, then cooled according to the process as described above to an intermediate temperature, and subsequently cooled by an additional cooling process to a cryogenic temperature and then sent to a distillation column of a cryogenic distillation unit.

Additionally, the invention provides an apparatus for cooling a compressed gas stream comprising an elongated vessel having an axis orientation, substantially vertical, wherein said elongated vessel comprises:
a) a first end and a second end;
b) a first compartment for indirect heat exchange between the compressed gas stream and at least one cooling stream;
c) a second compartment for direct contact between the cooled compressed gas stream and a liquid stream, said first and second compartments being separated by a barrier which, in use, allows the upward passage of gas but prevents the downward passage of liquid;
d) a conduit for introducing the compressed gas stream into the first compartment proximate to the first end;
e) a conduit for removing the cooled compressed gas stream from the second compartment proximate to the second end;
f) a conduit for introducing the at least one cooling stream into the first compartment;
g) a conduit for removing the warmed at least one stream from the first compartment;
h) a conduit for introducing the liquid stream into the second compartment proximate to the second end; and
i) a conduit for removing the warmed liquid stream from the second compartment proximate to the barrier.

Additional embodiments of the apparatus may comprise:
a) means for introducing at least two cooling streams into the first compartment;
b) means for permitting indirect contact between the compressed gas stream and the cooling stream in the first compartment;
c) means for permitting direct contact between the compressed gas stream and a liquid stream in the second compartment; and
d) means for introducing a further second liquid stream into the second compartment at an intermediate point thereof.

The invention also provides an apparatus for cooling a compressed gas stream comprising both a first and a second elongated vessels having an axis oriented, in use, substantially vertically, each of said vessels comprising a first end and a second end, the first vessel comprising a compartment for indirect heat exchange between a compressed gas stream and at least one cooling stream to produce a cooled compressed gas stream and the second vessel having a compartment for direct contact between the cooled compressed gas stream and a liquid stream, a conduits for introducing the compressed gas stream into the first compartment proximate to its first end, a conduit for removing the cooled compressed gas stream from the first compartment proximate to the second end, a conduit for introducing the cooled compressed gas stream into the second vessel proximate to its first end, a conduit for removing a further cooled compressed gas stream from the second vessel proximate to its second end, a conduit for introducing the at least one cooling stream into the first vessel, a conduit for removing the warmed at least one cooling stream from the first vessel, a conduit for introducing the liquid stream into the second vessel proximate to the second end, and a conduit for removing the warmed liquid stream from the second vessel proximate to its first end.

An additional aspect of the invention, provides an air separation apparatus comprising a compressor, a conduit for sending air to the compressor, a cooling apparatus as described above, a conduit for sending air from the compressor to the cooling apparatus, a conduit for sending air from the cooling apparatus to a further cooling apparatus, a column system comprising at least one distillation column, a conduit for sending air from the further cooling apparatus to a column of the column system and a conduit for removing a product from a column of the column system.

Another embodiment provides an air separation apparatus comprising a compressor, a conduit for sending air to the compressor, a cooling apparatus as described above, a conduit for sending air from the compressor to the cooling apparatus, a conduit for sending air from the cooling apparatus to a further cooling apparatus, a column system comprising at least one distillation column, a conduit for sending air from the further cooling apparatus to a column of the column system and a conduit for removing a product from a column of the column system.

In FIG. 1, an adiabatic compressor 1 is used to compress an air stream 2. If compressed to around 7 bars abs, the air is at a temperature of around 350° C. The air is then sent to a heat exchanger where it is used to heat two streams of water 37, 39 at two different pressures in a heat exchanger 3 to form streams of steam 7, 9 at two different pressures. It will be understood that several heat exchangers could replace exchanger 3 depending on the number of streams of steam to be produced. Typically, exchanger 3 can be considered as a compartment having first and second ends in which indirect heat exchange takes place between at least one water stream and the compressed air to produce a cooled compressed air stream.

The air 4 cooled in exchanger 3 is sent to the bottom of a cooling tower 5 where it exchanges heat by direct contact with water 15, 17 introduced at two separate points.

The air 17 cooled in the cooling tower 5 is then purified in purification unit 8.

Figure 2:
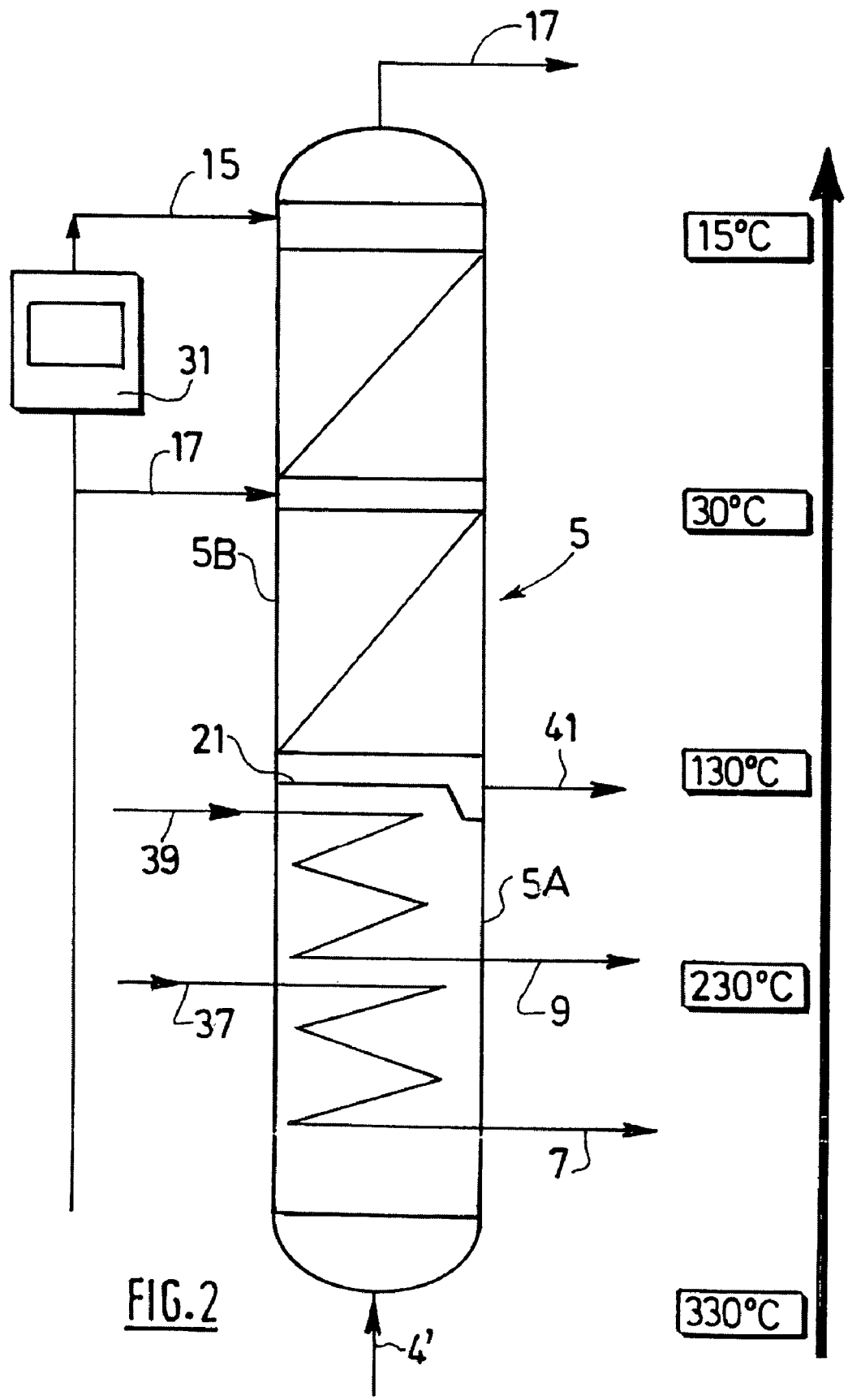
FIG. 2 illustrates a second embodiment of the invention.

According to a further embodiment as shown in FIG. 2, the exchanger 3 is not required and the heat exchange between the streams of water 37, 39 and the air coming directly from compressor 1 takes place at the bottom of the cooling tower 5. The cooling tower 5 is divided into two compartments: a first compartment 5A in which the indirect contact takes place between the hot air 4 and the streams of water 37, 39 and a second compartment 5B in which the direct contact takes place between the air cooled in the first compartment and at least one water stream 15, 17 introduced into the second compartment. A barrier 21 prevents water passing down the second compartment 5B penetrating the first compartment 5A but allows air to pass upwardly from the first compartment into the second compartment 5B.

In the first compartment 5A, the water stream at the higher pressure 37 circulates in a coil 137 at the bottom of the compartment where the temperature is highest and the water stream at the lower pressure 39 circulates in another coil 139 above coil 137 where the temperature is lower. It will be appreciated that any number of streams of water and/or coils may be used.

The second compartment 5B contains trays, structured packing, random packing or any other packing allowing mass and heat transfer between air and water. The water stream 15 following cooling in absorption type cooler 31 is introduced at the top of the tower and water stream 17 is introduced at an intermediate point of the second compartment 5B. The air rises up the second compartment 5B from the first compartment and is cooled therein by direct heat transfer with the water. The warmed water 41 is removed at the bottom of the second compartment and then recycled to the cooling tower in a manner well known from the prior art.

The cooled air removed at the top of the column is purified, further cooled in a cryogenic heat exchanger and sent to a column of a distillation column system to be separated into gaseous and/or liquid products. At least one product may be sent to a unit for which steam is required, the steam being produced by vaporization against the compressed air stream, as shown in FIGS. 1 and 2.

It will be appreciated that while one embodiment of the invention has been shown and described hereinbefore, many modifications may be made by the person skilled in the art without departing from the spirit and scope of this invention.

What is claimed is:

1. A process for cooling a gas stream in an apparatus comprising:
   a) providing at least one elongated vessel having a orientation, substantially vertical, wherein said elongated vessel comprises:
      (i) a first end and a second end;
      (ii) a first compartment for indirect heat exchange between a gas stream and at least one cooling stream to produce a cooled gas stream;
      (iii) a second compartment for direct contact between said cooled gas stream and a liquid stream to produce a further cooled gas stream; and
      (iv) a barrier which separates said first and second compartments, and when in use, allows for the upward passage of gas, but prevents the downward passage of liquid;
   b) introducing the gas stream into said first compartment proximate to said first end, removing said further cooled gas stream from said second compartment proximate to said second end;
   c) introducing at least one cooling stream into said first compartment removing said warmed at least one cooling stream from said first compartment; and
   d) introducing a liquid stream into said second compartment proximate to said second end, and removing said warmed liquid stream from said second compartment proximate to said barrier.

2. The process of claim 1, comprising the introduction of at least two cooling streams into said first compartment, wherein said cooling streams have different pressures or different temperatures.

3. The process of claim 1, comprising the exchange of heat by indirect contact between said gas stream and said at least one cooling stream in said first compartment and by direct contact between said cooled gas stream and said liquid stream in said second compartment.

4. The process of claim 3, wherein said at least one cooling stream is a liquid comprising vaporizing said cooling stream in said first compartment by heat exchange with said gas stream and removing said at least one cooling stream from said first compartment as a vapor.

5. The process of claim 1, comprising the introduction of an additional liquid stream into an intermediate point of said second compartment.

6. A process for the separation of air comprising:
   a) compressing the air;
   b) cooling according to the process of claim 1 to an intermediate temperature;
   c) cooling by an additional cooling process to a cryogenic temperature; and
   d) sending to a distillation column of a cryogenic distillation unit.

7. An apparatus for cooling a compressed gas stream comprising:
   a) an elongated vessel having an axis oriented, in use, substantially vertically, comprising:
      i) a first end and a second end;
      ii) a first compartment for indirect heat exchange between the compressed gas stream and at least one cooling stream;
      iii) a second compartment for direct contact between the cooled compressed gas stream and a liquid stream;
      iv) a barrier in which said first and second compartments are separated, and when in use, allows for the upward passage of gas, but prevents the downward passage of liquid;
   b) a conduit for introducing the compressed gas stream into the first compartment proximate to the first end;
   c) a conduit for removing the cooled compressed gas stream from the second compartment proximate to the second end;
   d) a conduit for introducing the at least one cooling stream into the first compartment;
   e) a conduit for removing the warmed at least one stream from the first compartment;
   f) a conduit for introducing the liquid stream into the second compartment proximate to the second end; and
   g) a conduit for removing the warmed liquid stream from the second compartment proximate to the barrier.

8. The apparatus of claim 7, comprising a conduit for introducing at least two cooling streams into said first compartment.

9. The apparatus of claim 7, comprising means for permitting indirect contact between said compressed gas stream and said cooling stream in said first compartment and means for permitting direct contact between said compressed gas stream and a liquid stream in said second compartment.

10. The apparatus of claim 7, comprising a conduit for the introduction of an additional liquid stream into an intermediate point of said second compartment.

11. An air separation apparatus, comprising:
    a) a compressor;
    b) a conduit for sending air to a compressor;
    c) a cooling apparatus according to claim 7;
    d) a conduit for sending air from said compressor to said cooling apparatus;
    e) a conduit for sending air from said cooling apparatus to a further cooling apparatus;
    f) a column system comprising at least one distillation column;
    g) a conduit for sending air from said further cooling apparatus to a column of said column system; and
    h) a conduit for removing a product from a column of said column system.

12. An air separation apparatus, comprising:
    a) a compressor;
    b) a conduit for sending air to the compressor;
    c) An apparatus for cooling a compressed gas stream comprising:
       i) first and second elongated vessels having an axis oriented, in use, substantially vertically, wherein each said vessel comprises a first end and a second end;

ii) said first vessel comprises a compartment for indirect heat exchange between a compressed gas stream and at least one cooling stream to produce a cooled compressed gas stream;
iii) said second vessel having a compartment for direct contact between said cooled compressed gas stream and a liquid stream;
iv) a conduit for introducing said compressed gas stream into said first compartment proximate to its first end;
v) a conduit for removing said cooled compressed gas stream from said first compartment proximate to the second end;
vi) a conduit for introducing said cooled compressed gas stream into said second vessel proximate to its first end;
vii) a conduit for removing a further cooled compressed gas stream from said second vessel proximate to its second end;
viii) a conduit for introducing said at least one cooling stream into said first vessel;
ix) a conduit for removing said warmed at least one cooling stream from said first vessel;
x) a conduit for introducing said liquid stream into said second vessel proximate to the second end; and
xi) a conduit for removing said warmed liquid stream from said second vessel proximate to its first end;

d) a conduit for sending air from the compressor to the cooling apparatus;

e) a conduit for sending air from the cooling apparatus to a further cooling apparatus;

f) a column system comprising at least one distillation column;

g) a conduit for sending air from the further cooling apparatus to a column of the column system; and h) a conduit for removing a product from a column of the column system.

* * * * *